July 11, 1944.  E. C. BROOKING  2,353,293
INDUSTRIAL SHOCK ABSORBER
Filed Jan. 2, 1943
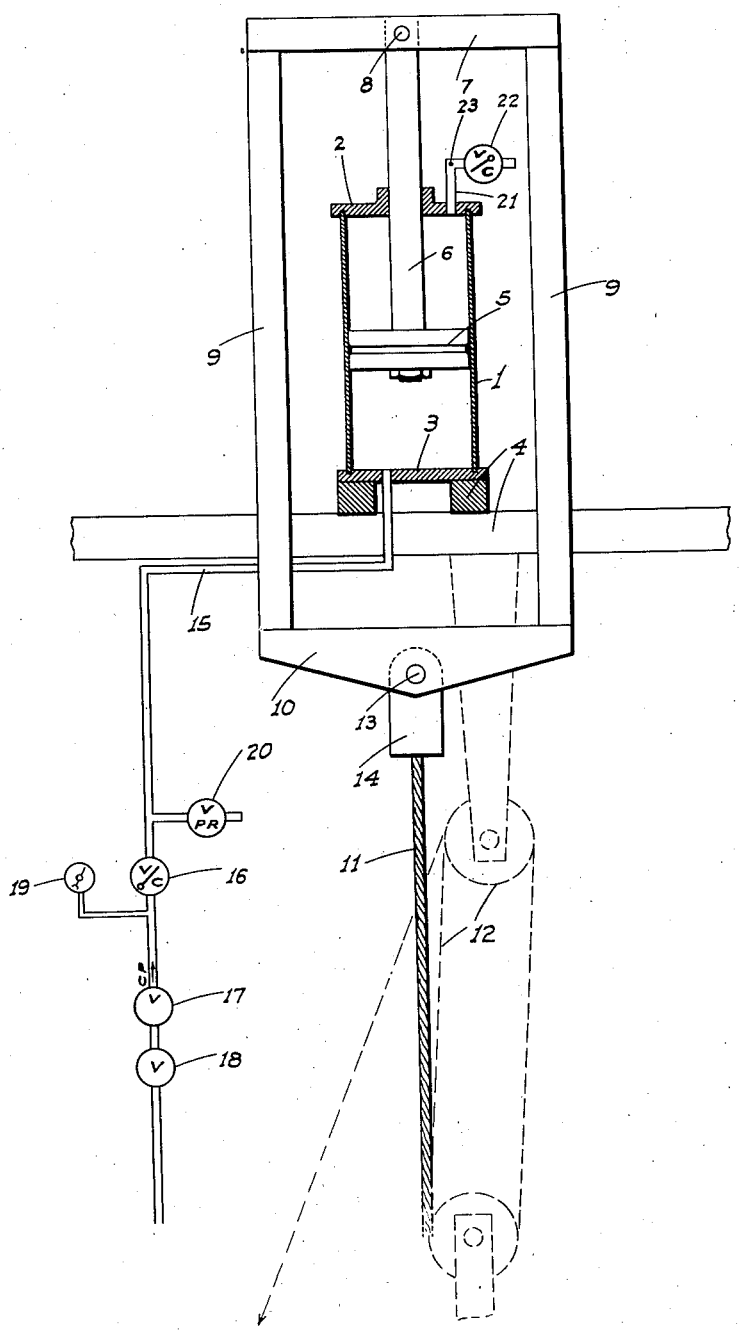
INVENTOR
*Edgar C. Brooking*
BY
*ATTYS*

Patented July 11, 1944

2,353,293

UNITED STATES PATENT OFFICE 2,353,293

INDUSTRIAL SHOCK ABSORBER

Edgar C. Brooking, Toccoa, Ga., assignor to R. G. Le Tourneau, Inc., Stockton, Calif., a corporation of California Application January 2, 1943, Serial No. 471,184

2 Claims. (Cl. 267—1)

This invention relates in general to a shock absorber for industrial machines, and in particular the invention is directed to, and it is the principal object to provide, a shock absorber assembly adapted for connection with the dead-end reach of a block and tackle employed to actuate an industrial machine, and especially cable actuated power presses.

In cable actuated power presses the cable of the block and tackle unit is subjected to a sudden and severe maximum load when the press and work engage; the instant invention being arranged for connection with said block and tackle unit to relieve said sudden and severe load and to consequently prevent undue strain on and probable breakage of the cable.

A further object of this invention is to provide a shock absorber for the purpose described which includes a cylinder, a piston slidable in said cylinder and including a piston rod projecting therefrom; the dead-end reach of the machine actuating block and tackle unit being connected with said piston rod in a manner to advance the piston in a compression producing direction when the block and tackle unit is subjected to the load, and the resultant compression in the cylinder being controlled by a check valve to effect the desired shock absorbing action.

An additional object of the invention is to provide a shock absorber, as in the preceding paragraph, in which an air-pressure supply conduit is connected with the cylinder so as to return the piston to normal position adjacent one end of the cylinder between shock-absorbing strokes thereof; the cylinder being provided with means to prevent too rapid return of said piston to its normal position.

A further object of the invention is to produce a simple and inexpensive device and yet one which will be exceedingly effective for the purpose for which it is designed.

The objects I accomplish by means of such structure and relative arrangement of parts as will fully appear by a perusal of the following specification and claims.

The figure of the drawing is a partly sectional side elevation of the shock absorber as attached to the block and tackle unit of a cable actuated machine; the block and tackle unit, together with the air control means for the cylinder, being shown diagrammatically.

Referring now more particularly to the characters of reference on the drawing, the numeral 1 indicates a cylinder including fixed heads 2 and 3; said cylinder being mounted in fixed and supported relation by suitable means indicated at 4. For use with some types of large-sized cable actuated industrial machines, the supporting members 4 comprise the roof assembly of the building which houses the machine.

A piston 5 is slidably disposed in the cylinder 1 and a piston rod 6 projects axially from piston 5 through cylinder head 2 to a termination therebeyond. At its outer end the piston rod 6 is fitted with a cross arm 7 pivotally connected centrally of its ends, as at 8, to the outer end of piston rod 6. Pull arms 9 are fixed in connection with the outer ends of cross arm 7 and thence extend parallel to and along opposite sides of the cylinder 1; said arms terminating at their other ends some distance beyond the cylinder. At said other ends the arms are rigidly connected by a cross member 10. Arms 7, 9 and 10 thus together form a swinging yoke suspended from the piston rod and straddling the cylinder.

The above described apparatus is mounted in position with the longitudinal axis of the cylinder 1 in substantial axis alinement with the dead-end reach 11 of the block and tackle actuating unit, indicated diagrammatically at 12, of an industrial machine; said dead-end reach being connected in pivotal relations, as at 13, centrally to the cross member 10 by a clevis 14 or the like.

A conduit 15 connects at one end with cylinder 1 through head 3, and is connected at the other end with a source (not shown) of air under pressure. A check valve 16 closing toward said source is interposed in conduit 15 intermediate its ends, while a constant output pressure regulating valve 17 and a manually actuated shut-off valve 18 are included in said conduit between check valve 16 and said source. An air gauge 19 is in communication with the conduit between the check valve 16 and the pressure regulating valve 17.

Between the check valve 16 and the cylinder 1 a pressure relief or "pop-off" valve 20, opening to the atmosphere, is arranged in communication with the conduit. Another conduit 21 is in communication with the cylinder 1 through head 2, and said other conduit includes a check valve 22 opening toward the cylinder, and a relatively small bleed hole 23 in the conduit between check valve 22 and said cylinder.

In operation, the pressure in conduit 15 is controlled to a predetermined constant by valve 17, and which pressure is sufficient to move piston 5 in cylinder 1 toward head 2 against the pull of the dead-end reach 11 of the block and tackle unit 12 when the latter is released.

When the block and tackle unit 12 is actuated, and a sudden and severe load is imparted thereto, such load is likewise imparted to dead-end reach 11. When this occurs, the piston 5 is pulled toward cylinder head 3 through the medium of the yoke and piston rod 6. With such advance of piston 5, the air in the cylinder between said piston and head 3 is compressed, producing a shock absorbing action which prevents breakage of the cable of the block and tackle unit 12. The extent of such shock absorbing action is regulated by adjustment of pressure relief valve 20. In order to prevent the compression in the cylinder from backing up in conduit 15 against the pressure regulating valve 17, the check valve 16 is employed.

After a shock absorbing action has been completed and the block and tackle unit 12 is released, air under pressure from conduit 15 surges into cylinder 1 between piston 5 and head 3, forcing said piston toward head 2. In order to check such movement of the piston, the conduit 21 having the bleed opening 23 is provided; such bleed opening being of a size to permit only of relatively slow exhaust of the air from the portion of the cylinder between piston 5 and head 2.

The check valve 22 in conduit 21, and which check valve opens toward the cylinder, permits relatively free entry of air into the cylinder between piston 5 and head 2 as the piston is pulled toward head 3 during the shock-absorbing movement of the piston, but closes upon return movement thereof.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A shock absorber for an industrial machine which includes an element intermittently subjected to a sudden and severe load in a certain direction; said shock absorber comprising a closed cylinder, a piston slidable in the cylinder, means connecting said element and the piston so that when the element is subjected to said load the piston is moved toward one end of the cylinder and produces shock absorbing compression on one side of said piston, means normally acting on the piston and urging the same toward the other end of the cylinder; and a pressure relief valve in communication with the cylinder on said one side of the piston, said valve being set to relieve said compression in excess of a predetermined amount, a conduit in communication with the cylinder on the other side of the piston, and a check valve in said conduit opening toward the cylinder; there being a bleed hole in said conduit between said check valve and the cylinder, said conduit outwardly of the check valve, and said bleed hole, being open to atmosphere.

2. A pneumatic shock absorber for an industrial machine which includes an element intermittently subjected to a sudden and severe load in a certain direction; said shock absorber comprising a closed cylinder, a piston slidable in the cylinder, means connecting said element and the piston so that when the element is subjected to said load the piston is moved toward one end of the cylinder and produces shock absorbing air compression on one side of said piston, a pressure relief valve arranged in communication with the cylinder on said side of the piston, said pressure relief valve venting to atmosphere and being set to relieve compression in excess of a predetermined amount, an air pressure supply conduit connected with the cylinder on the same side of the piston, a check valve in said conduit opening toward the cylinder, another conduit in communication with the cylinder on the other side of the piston, and a separate check valve in said other conduit opening toward the cylinder; there being a bleed hole in said other conduit between said separate check valve and the cylinder, said other conduit outwardly of said separate check valve, and said bleed hole, being open to atmosphere.

EDGAR C. BROOKING.